March 2, 1965 F. JAKOB ETAL 3,171,339
CONTROL ARRANGEMENT FOR AUTOMATIC CAMERAS
Filed Dec. 4, 1961
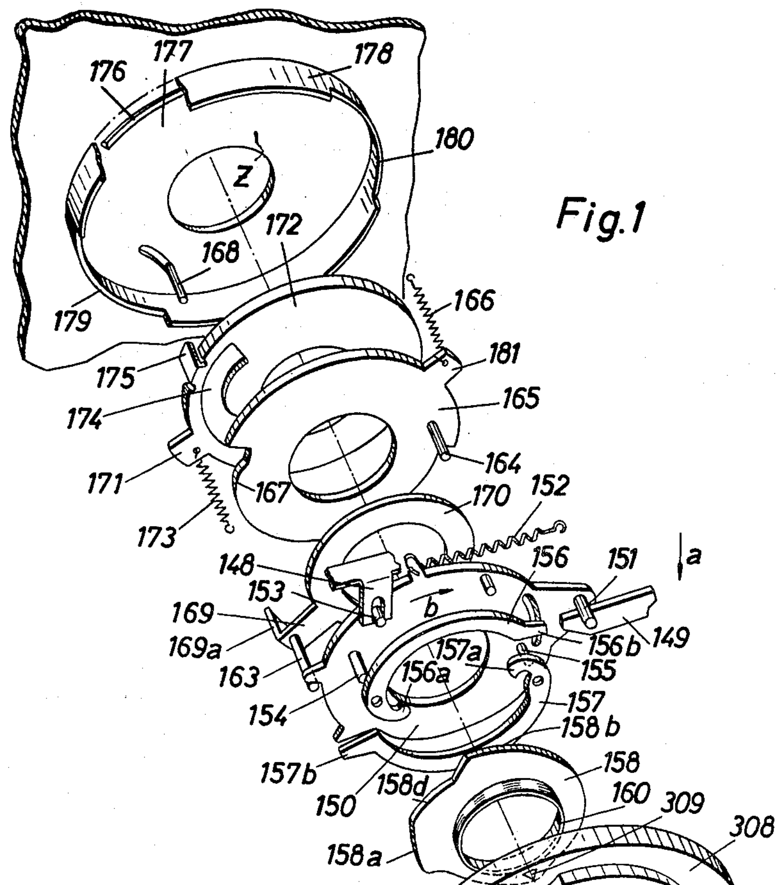
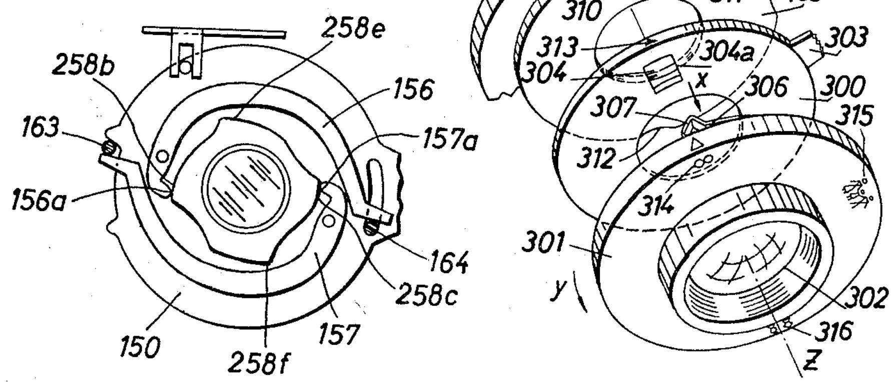
INVENTOR.
FRANZ JAKOB
ROLAND KNORR
BY
Michael S. Striker
Attorney United States Patent Office 3,171,339
Patented Mar. 2, 1965

1

3,171,339
CONTROL ARRANGEMENT FOR AUTOMATIC CAMERAS

Franz Jakob, Unterhaching, near Munich, and Roland Knorr, Munich, Germany, assignors to Agfa Aktiengesellschaft, Leverkusen-Bayerwerk, Germany Filed Dec. 4, 1961, Ser. No. 156,689
Claims priority, application Germany, Dec. 10, 1960, A 36,250
15 Claims. (Cl. 95—64)

The present invention relates to cameras. More particularly, the present invention relates to cameras which are capable not only of providing a fully automatic setting of the exposure time and the exposure aperture but which are also capable of providing such setting of the exposure time and exposure aperture according to preselected programs of control, so that the particular program of control of the exposure time setting structure and the exposure aperture setting structure will be adapted to the particular conditions prevailing when a particular exposure is made.

As is well known, it is possible to focus a modern camera all the way from infinity to a distance where the objective is focused on a subject located extremely close to the camera. When focusing on a subject which is relatively close to the camera extreme care must be taken to provide precise focusing. The reason for this is that when focusing on a subject close to the camera a relatively large percentage of the available depth of field is occupied by the subject itself. On the other hand, when focusing on a subject which is relatively distant from the camera, only a small percentage of the available depth of field is occupied by the subject so that a satisfactory photograph will be made without exercising the great care in focusing which is essential when focusing on a subject close to a camera. Thus, it is known that for a given setting of the diaphragm there will be a certain available field. When this available depth of field is applied to a subject close to the camera, the entire depth of field of the given setting of the diaphragm is relatively short, while when the same diaphragm setting is used when focusing on a subject distant from the camera the depth of field becomes correspondingly greater so that even with the same setting of the diaphragm it is not necessary when focusing on a subject distant from the camera to focus with the same precision which would be required when focusing on a subject close to the camera.

The present invention takes recognition of this latter condition and it is a primary object of the present invention to provide in an automatic camera of the above type a structure which will eliminate the necessity for the operator to consider whether he must focus very precisely because the subject is close to the camera or whether he need not exercise extreme care in focusing because the subject is relatively distant from the camera.

A further object of the present invention is to provide a camera construction of the above type which will automatically give the maximum possible depth of field when photographing a subject close to the camera so that the greatest possible allowance is made for errors in focusing under these conditions.

A still further object of the present invention is to provide a camera which will operate automatically to provide settings of exposure time and exposure aperture

2 which are most appropriate for the particular distance between the subject and the camera with a view to eliminating the necessity for the operator to consciously determine whether or not he need focus the camera with extreme precision.

It is furthermore an object of the invention to provide a structure of the above type which will automatically operate the exposure time setting means and exposure aperture setting means either in a predetermined selected sequence with respect to each other or simultaneously according to whichever program of operation is most appropriate for the particular distance between the subject and the camera.

Yet another object of the present invention is to provide a structure of the above type which gives to the operator the possibility of providing completely independent selection of the program of operation of the exposure time setting structure and exposure aperture setting structure and the operation of the objective-focusing structure at the option of the operator.

The objects of the present invention also include the provision of a structure which while capable of accomplishing all of the above objects is at the same time extremely simple and compact as well as inexpensive and reliable in operation.

With these objects in view the invention includes, in a camera, an exposure time setting means and an exposure aperture setting means and a movable control means movable to a plurality of different positions and cooperating with both of these setting means for automatically operating them according to different programs when the control means is in its different positions, respectively. A focusing means is provided for focusing the objective of the camera, and in accordance with the present invention this focusing means is coupled to the control means to automatically move the latter to a position which will provide a program of operation of both of these setting means which is most appropriate to the particular setting of the focusing means.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is an exploded perspective view of one possible embodiment of a structure according to the present invention, and FIG. 2 is a diagrammatic illustration of another embodiment.

Referring now to FIG. 1, it will be seen that the structure illustrated therein includes a rotary ring 150 which is located approximately midway between the ends of the assembly illustrated in the drawing, this rotary ring 150 being turnable about the optical axis Z—Z illustrated in the drawing. The ring 150 is an adjusting ring which participates in adjustment of the exposure time and exposure aperture in a manner described below, and the ring 150 carries a pin 151 which extends parallel to the optical axis and which bears against an element 149. A spring 152 is connected at one end to a stationary part of the camera and at its opposite end to a projection of the ring 150, so that the spring 152 urges the ring 150 to turn in the direction of the arrow *b* shown in the drawing. Thus, as a result of the action of the spring 152 the pin 151 remains in engagement with the arm 149. This arm 149 forms part of a conventional manually operable release structure which is manually moved in the direction of the arrow *a* when the camera is to be automatically set just prior to the making an exposure. A return spring which is stronger than the spring 152 acts in a well known manner on the arm 149 to raise it to the illustrated rest position, and the operator will manually depress the arm 149 in opposition to its return spring in order to release the ring 150 to the force of the spring 152. The ring 150 in addition carries a pin 153 which is located in an elongated notch formed in an arm 148 of a scanning element which is movable horizontally in response to turning of the ring 150 in the direction of the arrow *b*, and this scanning element is well known and in a well known manner will engage a pointer of a light meter so that the extent of movement of the scanning element is limited according to the lighting conditions and because of its connection 148, 153 with the ring 150 the extent of turning of the latter by the spring 152 will also be limited according to the lighting conditions, so that in this way the camera structure will be set, as is described below, according to the lighting conditions in a fully automatic manner.

The rotary ring 150 fixedly carries a pair of parallel pins 154 and 155 which are located at diametrically opposed parts of the ring 150 and which extend parallel to the optical axis Z—Z at equal distances therefrom. The pin 154 serves to pivotally support the arcuate motion transmitting member 156, while the pin 155 serves to pivotally support the arcuate motion transmitting member 157. Each of these motion transmitting members is in the form of a two-armed lever having in a general way a semi-circular construction. At their inner ends the levers 156 and 157 are respectively provided with the cam-follower portions **156*a* and 157*a*. These cam follower portions cooperate with the rotary cam 158 which forms part of the control means of the structure shown in the drawing, this cam 158 being connected with a manually turnable ring 159 so as to turn therewith, and the assembly 158, 159** forms a movable control means which, in a manner described below, is movable to a plurality of different positions for providing different programs of control, respectively, of the exposure time setting means and exposure aperture setting means.

The free end **157*b* of the motion transmitting lever 157 engages and cooperates with a motion transmitting pin 163, while the free end 156*b* of the motion transmitting lever 156 cooperates with and engages a motion transmitting pin 164. This pin 164 is directly fixed to a rotary exposure time setting ring 165 forming part of the exposure time setting means of the camera, and this ring 165 is connected to one end of the spring 166 whose opposite end is connected to a stationary part of the camera. The exposure time setting ring 165 includes a camming portion 167 engaged by a pin 168 of a conventional retarding structure which according to the position of the pin 168 will provide a predetermined retarding in the movement of the mechanism which runs down during the actuation of the shutter in a well known manner. The pin 163 is fixed to an arm 169 which projects radially from a ring 170 which is an exposure aperture setting ring and forms part of the exposure aperture setting means of the camera, this ring 170 as well as the ring 165 being turnable about the optical axis of the camera. At its free end the arm 169 has an axially extending portion 169*a* which engages a projection 171 of an additional ring 172 of the exposure aperture setting structure or means, and a spring 173 is connected at the one end to the exposure aperture setting ring 172 and at its opposite end to a stationary part of the camera so as to urge this ring 172 to turn in a counterclockwise direction, as viewed in the drawing, so as to maintain the radial projection 171 of the ring 172 in engagement with the portion 169*a* of the arm 169 of the ring 170. The exposure aperture setting ring 172 is formed with an arcuate opening 174 through which the pin 168 freely extends into engagement with the camming edge 167 of the ring 165, and the length and size of the arcuate slot 174 is such that in all possible positions of the exposure time setting means and exposure aperture setting means the ring 172 will in no way interfere with the cooperation between the pin 168 and the ring 165. This ring 172 in addition includes an axial projection 175 which extends freely through an arcuate slot 176 formed in the wall 177 of the camera, and on the side of the wall 177 opposite from that which is visible in the drawing the projection 175 engages a rotary diaphragm ring for turning this ring to adjust the position of the blades of the diaphragm in accordance with the angular position of the ring 172. Thus, the rings 170 and 172 provide an exposure aperture setting means and the exposure aperture will be set in accordance with the angular position of these rings 170 and 172**.

In order to limit the extent of turning of the rings 165 and 172, the wall 177 fixedly carries a cylindrical ring 178 formed in its forward edge with a pair of notches 179 and 180. The notch 179 receives the projection 171 of the rings 172, so that this ring 172 can only turn between the end positions where the projection 171 engages the ends of the notch 179, and in much the same way the notch 180 receives the projection 181 of the ring 165 so that this latter ring can turn only through the angular distance limited by engagement of the projection 181 with the ends of the notch 180.

The camming element 158 of the control means has a camming portion **158*a* located at a relatively large distance of the optical axis and merging at one end with a camming portion 158*d* which extends along a helix. In addition the cam 158 includes a pair of diametrically opposed camming portions 158*b* and 158*c* each of which is located at one end at a relatively great distance from the optical axis and approaches the optical axis and becomes gradually cylindrical in the direction of turning of the ring 150**, which is to say in the direction *b* shown in the drawing.

The rotary member 159, which is fixed to the rotary member 158 through the tubular member 160 and which is turnable therewith about the optical axis and forms therewith the movable control means of the structure shown in the drawing, is adapted to be manually engaged and turned, and parallel to the manually turnable ring 159 of the control means are a pair of rings 300 and 301 both of which are turnable about the optical axis, the ring 300 serving as a ring for coupling and uncoupling a connection between the ring 301 and the ring 159, this ring 301 being the focusing ring which forms the focusing means for focusing the objective of the camera. In order to focus the objective the ring 301 is connected with a front lens 302 of the objective and turning of the ring 301 will adjust the axial position of the lens 302 along the optical axis, in a well known manner, for the purpose of focusing the objective. Instead of this arrangement, however, the focusing ring 301 can be connected in a conventional, well known manner through a suitable thread or worm drive with the entire objective which in this case will be supported for movement along the optical axis to a position determined by the angular position of the ring 301.

The coupling-control ring 300 has a manually-engageable projection 303 accessible to the operator, and in addition the ring 300 is formed with an opening 304. The means for releasably coupling the focusing ring 301 with the ring 159 of the control means includes, in the illustrated example, a releasable detent structure made up of the leaf-spring 306 which is fixed to the focusing ring 301 for turning movement therewith and which includes the free end portion 307 of substantially V-shaped configuration adapted to extend through the opening 304 into a cutout 305 formed in the ring 159, so that when the end 307 of the spring 306 is in the cutout 305 the coupling means is engaged and the ring 301 is coupled with the control means 158–160. Thus, by bringing the opening 304, upon turning of the ring 300 by engaging its extension 303, into alignment with the cutout 304 it is possible to place the springy detent element 306 with its end 307 in the cutout 305 to effect engagement of the coupling means which is provided for coupling the rings 301 and 159 to each other at the option of the operator.

The assembly includes a stationary ring 308 which may be connected to the structure which supports the remaining elements for rotary movement, and this ring 308 carries a stationary index 309 which is adapted to cooperate with the ring 159 of the control means. This ring 159 is formed with depressions 310, 311, 312 which interrupt the knurled periphery of the ring 159 and within these depressions are located symbols indicating different programs of operation of the exposure time setting means and exposure aperture setting means. Thus, by aligning a selected depression of the ring 159 the symbol therein with the stationary index 309 the operator can position the movable control means 158–160 so as to provide a selected program of operation of the exposure time setting means and exposure aperture setting means. In addition, the stationary index 309 cooperates with an index 313 carried by the coupling-control ring 300 at its periphery, and the operator will know that when the ring 159 is in the illustration position with its symbol 1 aligned with the index 309 and the ring 300 is then brought into position where its index 313 is aligned with the index 309, then the opening 304 of the ring 300 will be exactly in alignment with the detent cutout 305 of the ring 159. Moreover, the stationary index 309 cooperates with indicia carried by the focusing ring 301 so as to indicate to the operator the angular positions thereof which will provide different distances of the focusing of the objective. In the particular example illustrated the indicia of the focusing 301 takes the form of symbols 314, 315, 316 which respectively illustrate a relatively great distance, an intermediate distance, and a relatively close distance.

The symbol 314 is the symbol of infinity, while the symbol 315 represents a group, and the symbol 316 represents a close-up. It will be noted that the focusing ring 301 carries at the same angular position as the symbol 314 an index which actually is indicative of the position of the free end 307 of the spring 306, so that with the use of this latter index, when it is aligned with the index 313 and both of these indexes are aligned with the index 309 the end 307 of the spring 306 will pass freely through the opening 304 into the cutout 305 so that the operator knows that when all of the indexes 309, 313, and the index at the periphery of the ring 301 are aligned with each other the coupling means is engaged and the control means will turn with the focusing ring 301 so that this latter ring will then provide automatic positioning of the control means to provide a program of control which, as will be apparent from the description below, is most appropriate for the particular setting of the focusing means 301.

While it is possible to eliminate the possibility of removably connecting the ring 301 to the ring 159 by connecting this ring 301 directly to the ring 159, the structure described above and shown in the drawing is preferred since with this construction the operator can, if desired, provide any selected program of control which does not necessarily correspond to the setting of the ring 301, and this latter type of operation is of course far more flexible and adapted to a greater variety of photographing conditions.

The parts are shown in the drawing in their rest positions, and in this rest position of the structure the exposure aperture setting means 169–172 provides the largest exposure aperture and the exposure time setting means 165 the longest exposure time.

In order to make an exposure where the control means 158–160 has its position automatically determined according to the setting of the focusing means 301, the several indexes are aligned with each other in the manner described above so that the coupling means will be engaged. It should be noted that it is not necessary for the operator to remember that in order for the coupling means to become engaged the ring 159 must be turned to the position shown in the drawing. With the index 313 and the index of the ring 301 aligned with each other and both aligned with the index 309, the operator need only turn the ring 159 until he hears the free end 307 of the detent spring 306 click through the opening 304 into the cutout 305, and the operator will then know that the releasable connecting means which connects the ring 301 to the ring 159 is engaged so that from that point on turning of the ring 301 will result in automatic positioning of the control means to provide a program of operation appropriate to the particular setting of the focusing means 301. The operator will then place one of the symbols 314–316 in alignment with the index 309 according to whether the operator focuses on a subject at a relatively great distance, at an intermediate distance, or at a relatively small distance from the camera.

Assuming now that it is desired to photograph with the objective focused on a subject which is close to the camera, then the operator will turn the focusing means 301 in the direction of the arrow *y* until the symbol 316 is aligned with the index 309. Inasmuch as the coupling means is engaged at this time the control means 158–160 will turn with the focusing means 301, and thus the cam 158 will also turn in the direction of the arrow *y*. When the symbol 316 has been aligned with the index 309 the camming portion 158*a* will be engaged by the cam follower portion 157*a* of the motion transmitting lever 157, and at the same time the cam follower portion 156*a* of the motion transmitting lever 156 will simply lie loosely against the portion of the cam 158 which is diametrically opposed to its camming portion 158*a*.

With the camera having been focused in this manner and the control means automatically moved in this manner by actuation of the focusing means, the operator will depress the arm 149 in the manner described above so that the spring 152 will turn the ring 150, and of course the motion transmitting levers 156 and 157 therewith, in the direction of the arrow *b*, and this turning will continue until the scanning structure which is connected to the arm 148 engages the pointer of the light meter and is stopped thereby in a well known manner, so that the angular position of the ring 150 will be determined in this way by the lighting conditions. During this turning of the ring 150 the lever 157 is maintained at such an angular position with respect to the pin 155 by the camming portion 158*a* that the end portion 157*b* of the lever 157 by its engagement with the pin 163 turns the ring 170. On the other hand, the loose engagement of the lever 156 with the cam 158 at this time simply permits the lever 156 to turn freely on the pivot 154 without in any way moving the pin 164. As a result, the exposure time setting means will not be actuated and the exposure time will remain at its maximum value. On the other hand, because the ring 170 is turned at this time the ring 172 also turns and thus the size of the aperture continuously diminishes as the ring 150 turns. If there is so much light available that when the exposure aperture setting means has reduced the diaphragm aperture to its smallest size there will still be an over exposure, then of course the ring 150 continues to turn and after the diaphragm has been adjusted to its entire range the end 157*a* of the lever 157 will move from the camming portion 158*a* onto the camming portion 158*d*, and because of the curvature of the camming portion 158*d*, this camming portion extending along a helix as pointed out above, the ring 150 will continue to turn while the lever 157 will compensate exactly for the turning of the ring 150 with its end 157*b* remaining in engagement with the pin 163 but not turning the latter angularly, so that the smallest exposure aperture remains at this time. At the moment when the cam follower portion 157*a* of the lever 157 reaches the end of the camming portion 158*a* and starts at the beginning of the cam portion 158*d*, the cam follower portion 156*a* of the lever 156 is controlled by the cam 158 so that the end portion 156*b* of the lever 156 will move the pin 164 and thus actuate the exposure time setting means so as to reduce the exposure time. In this way a setting will automatically be provided under the above conditions where the smallest possible exposure aperture is set into the camera, and thus when the operator focuses the camera on a subject which is relatively close thereto the operator will automatically select, without any awareness on the part of the operator, a program of operation according to which the greatest possible depth of field is guaranteed so that the precision with which the operator sets the focusing ring 301 is not so critical.

If the operator places the symbol 315 in alignment with the index 309, while the focusing ring 301 remains coupled to the ring 159, then this turning of the ring 301 will place the cam 158 in a position where the cam follower portions 156*a* and 157*a* of the levers 156 and 157 simultaneously engage the camming portions 158*b* and 158*c* of the cam 158. Thus, the camming portion 158*b* will be engaged by the cam follower portion 156*a* of the lever 156, while the camming portion 158*c* will be engaged by the end portion 157*a* of the lever 157. When the operator now depresses the arm 148 the ring 150 will again turn in the manner described above until the scanning element is stopped by the pointer of the light meter, and the motion transmitting levers 156 and 157 will both actuate at this time. The exposure time setting means and the exposure aperture setting means, the end 156*b* of the lever 156 moving the pin 164 so as to turn the exposure time setting ring 165, and the end 157*b* moving the pin 163 so as to turn the exposure aperture setting means 170, 172 simultaneously with the actuation of the exposure time setting means, the shape of the cam 158 being such that both of the levers 156 and 157 turn about their pivot pins simultaneously and to the same extent with the control means 158–160 in this position, so that simultaneously a reduction of the exposure time and in the exposure aperture is provided. The arrangement is such that the rings 165 and 172 at this time each turn through approximately one half of the angle through which the ring 150 turns. Thus, for an intermediate distance between the subject and the camera the control means is automatically placed in the position where the program of control will provide simultaneous reduction in the exposure aperture and the exposure time.

In the event that the operator places the symbol 314 in alignment with the index 309, as shown in the drawing, and assuming that the control means is coupled with the focusing means at this time, then the camming portion 158*a* will cooperate with the end 156*a* of the lever 156 while the lever 157 will simply have no influence on the pin 163 at this time, and thus a program which is the reverse of that which takes place when the symbol 316 is aligned with the index 309 now will be provided. In other words with this particular program the lever 156 will act on the pin 164 so as to reduce the exposure time to its minimum value before the structure will operate to reduce the size of the exposure aperture, and thus with objects which are relatively distant from the camera the structure of the invention will provide the largest possible exposure aperture and therefore the smallest depth of field.

In the event that the operator decides to uncouple the control means from the focusing means so that each of these latter means may be operated independently of the other, then it is only necessary for the operator to turn the coupling-control ring 300 in the direction of the arrow *y*, for example, and this will cause the edge 304*a* of the opening 304 to engage the free end 307 of the spring 306 and move this free end 307 in the direction of the arrow *x* shown in the drawing out of the cutout 305 so that the releasable detent structure is disengaged and thus the focusing ring 301 will be uncoupled from the control means 158–160, the opening 304 of course at this time being out of line with the opening 305 as well as the end 307 of the leaf spring 306, and thus with this construction the operator can with any setting of the ring 301 provide any selected position of the control means.

Of course, the invention is not limited to the specific details described above. For example, it is not absolutely essential to provide programs of control where one of the setting means is moved through its entire range before the other setting means is actuated except in the intermediate position where both are simultaneously actuated. Thus, instead of such an arrangement it is also possible to provide a cam 258 as represented in FIG. 2 corresponding to the cam 158 but having such a configuration that at all times the exposure time setting means and the exposure aperture setting means will be operated simultaneously. However, in this case in the position where the ring 301 is focused on a subject close to the camera, for example, the cam 258 will be in a position where the cam follower portion 157*a* engages the camming portion 258*f* and the cam follower portion 156*a* engages the camming portion 258*e*. Thus the exposure aperture setting means while moving simultaneously with the exposure time setting means will move at a faster rate and through a greater angular distance than the exposure time setting means so that the exposure aperture will be reduced at a greater rate than the exposure time is reduced, and in this way it is also possible to achieve a result where automatically a great depth of field is obtained when focusing on a subject close to the camera. In the same way with such a construction when focusing on a subject at a relatively great distance from the camera the cam 258 will be in a position where the cam follower portion 157*a* engages the camming portion 258*e* and the cam follower portion 156*a* engages the camming portion 258*f*. Now both of the setting means may operate simultaneously but the exposure time setting means will operate at a greater rate of speed than the exposure aperture setting means so that the exposure time will be reduced quicker than the exposure aperture is reduced, and this will be a program of operation particularly adapted for use when focusing on a subject which is relatively distant from the camera. For example, the arrangement may be such that when focusing on a subject close to the camera and the combination of the actuation of the exposure time setting means and exposure aperture setting means is such that there will be a reduction through four light values, the exposure aperture setting means would in fact be reduced through three light values while the exposure time setting means would be reduced through one light value, and of course the reverse relationship would be provided when focusing on a subject which is relatively distant from the camera.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, exposure time setting means and exposure aperture setting means; movable control means having a plurality of positions and cooperating in said positions thereof with said exposure time setting means and said exposure aperture setting means for providing different programs of operation of said exposure time setting means and said exposure aperture setting means in said different positions of said control means, respectively; focusing means for focusing the objective of the camera on subjects located at various distances from the camera; and connecting means connecting said focusing means to said control means for moving the latter to a position which will provide a program of operation of said exposure time setting means and exposure aperture means which is appropriate to the distance between the subject and the camera set with said focusing means.

2. In a camera, in combination, exposure time setting means and exposure aperture setting means; movable control means having a plurality of positions and cooperating in said positions thereof with said exposure time setting means and said exposure aperture setting means for providing different programs of operation of said exposure time setting means and said exposure aperture setting means in said different positions of said control means, respectively; focusing means for focusing the objective of the camera on subjects located at various distances from the camera; releasable connecting means having engaged and disengaged positions and cooperating with said focusing means and said control means, in said engaged position of said connecting means, for actuating said control means automatically upon actuation of said focusing means to provide a program of operation of said exposure time setting means and exposure aperture setting means which is appropriate to the setting of said focusing means.

3. In a camera, in combination, exposure time setting means and exposure aperture setting means; movable control means having a plurality of positions and cooperating in said positions thereof with said exposure time setting means and said exposure aperture setting means for providing different programs of operation of said exposure time setting means and said exposure aperture setting means in said different positions of said control means, respectively; focusing means for focusing the objective of the camera on subjects located at various distances from the camera; releasable connecting means having engaged and disengaged positions and cooperating with said focusing means and said control means, in said engaged position of said connecting means, for actuating said control means automatically upon actuation of said focusing means to provide a program of operation of said exposure time setting means and exposure aperture setting means which is appropriate to the setting of said focusing means; and selecting means cooperating with said connecting means for selectively placing the latter, according to the will of the operator, either in said engaged or in said disengaged position thereof so that at the option of the operator said control means may be moved automatically from said focusing means or independently of said focusing means.

4. In a camera, in combination, exposure time setting means and exposure aperture setting means; movable control means having a plurality of positions and cooperating in said positions thereof with said exposure time setting means and said exposure aperture setting means for providing different programs of operation of said exposure time setting means and said exposure aperture setting means in said different positions of said control means, respectively; focusing means for focusing the objective of the camera on subjects located at various distances from the camera; and releasable detent means releasably coupling said focusing means to said control means for moving the latter in response to a change in the setting of said focusing means to provide through said control means in an automatic manner a program of operation of said exposure time setting means and exposure aperture setting means which is appropriate to the setting of said focusing means.

5. In a camera, in combination, exposure time setting means and exposure aperture setting means; movable control means having a plurality of positions and cooperating in said positions thereof with said exposure time setting means and said exposure aperture setting means for providing different programs of operation of said exposure time setting means and said exposure aperture setting means in said different positions of said control means, respectively; focusing means for focusing the objective of the camera on subjects located at various distances from the camera; releasable detent means releasably coupling said focusing means to said control means for moving the latter in response to a change in the setting of said focusing means to provide through said control means in an automatic manner a program of operation of said exposure time setting means and exposure aperture setting means which is appropriate to the setting of said focusing means; and manually operable means cooperating with said releasable detent means for disengaging the latter to provide operation of said focusing means and control means independently of each other at the option of the operator.

6. In a camera, in combination, exposure time setting means and exposure aperture setting means; rotary control means turnable about the optical axis and cooperating with both of said setting means for providing different programs of operation thereof according to the angular setting of said rotary control means, said rotary control means including a rotary member; rotary focusing means also turnable about the optical axis and operatively connected to the objective of the camera for focusing the latter, said rotary focusing means also including a rotary member; a springy detent element operatively connected to one of said rotary members for turning movement therewith and the other of said rotary members being formed with a cutout receiving said detent element in a predetermined angular position of said rotary members with respect to each other, so that when said detent element is in said recess said rotary focusing means and rotary control means will turn as a unit to provide a program of operation of said exposure time setting means and said exposure aperture setting means appropriate to the setting of said rotary focusing means.

7. In a camera, in combination, exposure time setting means and exposure aperture setting means; rotary control means turnable about the optical axis and cooperating with both of said setting means for providing different programs of operation thereof according to the angular setting of said rotary control means, said rotary control means including a rotary member; rotary focusing means also turnable about the optical axis and operatively connected to the objective of the camera for focusing the latter, said rotary focusing means also including a rotary member; a springy detent element operatively connected to one of said rotary members for turning movement therewith and the other of said rotary members being formed with a cutout receiving said detent element in a predetermined angular position of said rotary members with respect to each other, so that when said detent element is in said recess said rotary focusing means and rotary control means will turn as a unit to provide a program of operation of said exposure time setting means and said exposure aperture setting means appropriate to the setting of said rotary focusing means; and a rotary coupling-control member located between said rotary members and formed with an opening aligned with said cutout and through which said detent element extends when said detent element is in said cutout coupling said rotary members to each other, whereby when said rotary coupling-control member is turned to another position with respect to said cutout where said opening of said coupling-control member is out of alignment with said cutout said detent element is displaced from said cutout by said coupling-control member and said rotary focusing means and said rotary control means are operable independently of each other.

8. In a camera, in combination, exposure time setting means and exposure aperture setting means; control means movable to a plurality of different positions and cooperating with both of said setting means for providing different programs of operation thereof in said positions of said control means, respectively; focusing means for focusing the objective of the camera; and means coupling said focusing means to said control means to automatically place the latter in a position providing, when said focusing means focuses the objective on a subject which is relatively close to the camera, a program of operation according to which said exposure aperture means will first reduce the exposure aperture from a maximum to a minimum size before the exposure time setting means will be actuated to reduce the exposure time from a maximum toward a minimum period of time.

9. In a camera, in combination, exposure time setting means and exposure aperture setting means; movable control means cooperating with both of said setting means for providing different programs of operation thereof in different positions of said control means, respectively; focusing means operatively connected to the objective of the camera for focusing the latter; and means coupling said focusing means to said control means to place the latter, when said focusing means focuses the objective on a subject relatively distant from the camera, in a position where said exposure time setting means will first reduce the exposure time from a maximum to a minimum period of time before the exposure aperture setting means is actuated to reduce the size of the exposure aperture.

10. In a camera, in combination, exposure time setting means and exposure aperture setting means; movable control means movable to a plurality of different positions and cooperating with both of said setting means for providing different programs of operation thereof in said positions of said control means, respectively; focusing means operatively connected to the objective of the camera for focusing the objective; and coupling means coupling said focusing means to said control means for automatically placing the latter in a position where said exposure time setting means and said exposure aperture setting means will simultaneously reduce the exposure time and the size of the aperture, respectively, when said focusing means focuses the objective of the camera on a subject which is at an intermediate distance from the camera which is not very near and not very far from the camera.

11. In a camera, in combination, exposure time setting means and exposure aperture setting means; movable control means movable to a plurality of positions and cooperating with both of said setting means for providing different programs of operation thereof in said conditions of said control means, respectively; focusing means for focusing the objective of the camera; and coupling means coupling said focusing means to said control means for automatically placing the latter in a position where said exposure aperture setting means will first reduce the size of the exposure aperture before said exposure time setting means reduces the exposure time, when said focusing means focuses the objective on a subject relatively close to the camera, in a position where said exposure time setting means will first reduce the exposure time before said exposure aperture setting means reduces the exposure aperture, when said focusing means focuses the objective on a subject relatively distant from the camera, and in a position where said exposure time setting means and exposure aperture setting means will simultaneously reduce the exposure time and the exposure aperture, respectively, when said focusing means focuses the objective on a subject located at an intermediate distance from the camera.

12. In a camera, in combination, exposure time setting means and exposure aperture setting means; control means movable to a plurality of different positions and cooperating with both of said setting means for providing different programs of operation thereof in said different positions, respectively; focusing means for focusing the objective of the camera; and coupling means coupling said focusing means to said control means for automatically placing the latter in a position where both of said setting means will be simultaneously actuated but where said exposure aperture setting means will reduce the exposure aperture at a faster rate than said exposure time setting means reduces the exposure time, when said focusing means focuses the objective on a subject relatively close to the camera, where said exposure time setting means will reduce the exposure time at a faster rate than said exposure aperture setting means reduces the exposure aperture, when said focusing means focuses the objective on a subject relatively distant from the camera, and where said exposure time setting means and exposure aperture setting means respectively reduce the exposure time and exposure aperture at approximately the same rate, when said focusing means focuses the objective on a subject located at an intermediate distance from the camera.

13. In a camera, in combination, exposure time setting means and exposure aperture setting means; automatic means for moving in response to change of light intensity; movable control means having a plurality of positions and cooperating in said positions thereof with said exposure time setting means and said exposure aperture setting means and with said automatic means for providing different programs of operation of said exposure time setting means and said exposure aperture setting means in said different positions of said control means, respectively, in response to the moving of said automatic means; focusing means for focusing the objective of the camera on subjects located at various distances from the camera; and connecting means connecting said focusing means to said control means for moving the latter to a position which will provide a program of operation of said exposure time setting means and exposure aperture means which is appropriate to the distance between the subject and the camera set with said focusing means.

14. In a camera, in combination, exposure time setting means and exposure aperture setting means; drive means adapted to be controlled by the lighting conditions and adapted to be released for operation by the operator; motion transmitting means operatively connected to said drive means to be driven thereby and being movable between a plurality of positions and cooperating in said positions thereof with said exposure time setting means and said exposure aperture setting means for providing different programs of operation of said exposure time setting means and said exposure aperture setting means in said different positions of said motion transmitting means, respectively; focusing means for focusing the objective of the camera on subjects located at various distances from the camera; and connecting means connecting said focusing means to said transmitting means for moving the latter to a position which will provide a program of operation of said exposure time setting means and exposure aperture means which is appropriate to the distance between the subject and the camera set with said focusing means.

15. In a camera, in combination, exposure time setting means and exposure aperture setting means; drive means adaped to be controlled by the lighting conditions and adapted to be released for operation by the operator; motion transmitting means operatively connected to said drive means to be driven thereby and being movable between a plurality of positions and cooperating in said positions thereof with said exposure time setting means and said exposure aperture setting means for providing different programs of operation of said exposure time setting means and said exposure aperture setting means in said different positions of said motion transmitting means, respectively; and cam means cooperating with said motion transmitting means for selectively placing the latter in one of the said positions; focusing means for focusing the objective of the camera on subjects located at various distances from the camera; and connecting means connecting said focusing means to said cam means for moving the latter to a position which will provide a program of operation of said exposure time setting means and exposure aperture means which is appropriate to the distance between the subject and the camera set with said focusing means.

References Cited by the Examiner

UNITED STATES PATENTS

| | | | |
|---|---|---|---|
| 2,925,765 | 2/60 | Gebele. | |
| 2,990,758 | 7/61 | Sauer et al. | 95—10 |
| 2,999,440 | 9/61 | Nerwin | 95—64 X |

NORTON ANSHER, *Primary Examiner.*

DELBERT B. LOWE, *Examiner.*